United States Patent [19]

Algieri et al.

[11] 3,981,954

[45] Sept. 21, 1976

[54] METHOD OF MELAMINE GLAZING OF POLYESTER SUBSTRATES

[75] Inventors: Salvatore Algieri, Somerville; Jonas Weiss, Plainfield, both of N.J.; Werner Theodor Raudenbusch, Rijsvijk, Netherlands

[73] Assignee: American Standard, Inc., New York, N.Y.

[22] Filed: Dec. 30, 1974

[21] Appl. No.: 537,498

Related U.S. Application Data

[63] Continuation of Ser. No. 355,250, April 27, 1973, abandoned.

[52] U.S. Cl. .............................. 264/240; 264/250; 264/255; 264/259; 264/331; 264/347
[51] Int. Cl.² ....................... B29D 9/08; B29G 1/00
[58] Field of Search ........... 264/131, 134, 126, 245, 264/246, 259, 139, 135, 255, 331, 129, 240, 250, 267; 260/249.6, 868, 861, 86.1 N, 249.6

[56] References Cited

UNITED STATES PATENTS

| 2,712,004 | 6/1955 | Thomas | 260/249.6 |
|---|---|---|---|
| 3,044,913 | 7/1962 | Lundberg | 260/868 |
| 3,056,760 | 10/1962 | D'Alelio | 260/86.1 |
| 3,305,514 | 2/1967 | Tiffin et al. | 260/861 |
| 3,410,943 | 11/1968 | Rosenberger et al. | 428/525 |
| 3,562,375 | 2/1971 | Guy et al. | 264/246 |
| 3,597,425 | 8/1971 | Shaines | 264/246 |

OTHER PUBLICATIONS

Wakeman, *Chemistry of Commercial Plastics*, Reinhold, N.Y., (1947), pp. 224–226 and 228–230.

*Primary Examiner*—Willard E. Hoag
*Attorney, Agent, or Firm*—James J. Salerno, Jr.; Robert G. Crooks

[57] ABSTRACT

A method of forming a polymer laminate which comprises mixing an unsaturated polyester resin with allyl melamine monomer; molding the mixture under heat and pressure to cause the allyl melamine to cross link the polyester chains and thereby produce a substrate; applying a melamine-formaldehyde glaze material to one face of the substrate; and heating the glazed substrate to effect polymerization and adherence of the glaze material on the substrate surface. The use of allyl melamine as the cross linking agent for the polyester prevents the glaze from cracking, blistering or peeling when subjected to heat, attack from household chemicals, or abrasion forces.

1 Claim, No Drawings

METHOD OF MELAMINE GLAZING OF POLYESTER SUBSTRATES

This is a continuation of application Ser. No. 355,250, filed Apr. 27, 1973, and now abandoned.

BACKGROUND OF THE INVENTION

It has previously been proposed to form articles of sanitary ware, such as lavatories and bathtubs, as polyester-melamine formaldehyde laminates. In such cases the polyester functions as a reinforcing substrate, and the melamine-formaldehyde resin or glaze functions as a hard glossy glaze on the polyester surface. The polyester contributes certain useful properties to the laminate, such as low weight, rigidity and toughness, good impact strength, and low material cost. The melamine-formaldehyde glaze contributes certain useful properties such as good stain resistance (iodine, hair spray, household cleansers, etc.), good gloss retention, satisfactory abrasion resistance, good heat resistance (cigarette burns, etc.), and good scratch resistance. The melamine-formaldehyde resin is relatively expensive. Therefore its use as a thin glaze is helpful in reducing the cost of the laminate.

Unfortunately it has been found difficult to bond the melamine resin directly on conventional cross linked polyesters which use styrene as a cross linking agent. The glaze tended to peel, blister or lose gloss when subjected to boiling water and other tests simulating service conditions.

An object of the present invention is to provide a method of forming polyester-melamine laminates which will not peel, blister or otherwise degrade when subject to heat, household chemicals, or abrasion forces normally encountered in lavatories, bathtubs, toilets or similar items of sanitary ware.

In practicing the invention we cross link the polyester chains at least partly with allyl melamine monomer instead of the usual styrene. When the melamine resin glaze is subsequently applied to the polyester the $NH_2$ groups in the allyl melamine cross linking agent serve as reactive sites for bonding with the melamine glaze coating. The formed laminate exhibits improved resistance against peeling, blistering or surface cracking. We believe that the best product results when the cross linking agent is entirely allyl melamine; however, it is presumed that the cross linking agent could include a minor percentage of styrene or other conventional cross linking agent if cost considerations were paramount.

The following Examples illustrate the invention:

EXAMPLE A

Polyester

An unsaturated polyester prepared from a polyol and a mixture of aromatic and alpha, beta unsaturated aliphatic polycarboxylic acids was prepared by melt-polycondensation of 4 moles isophthalic acid, 8.8 moles propyleneglycol, and 4 moles maleic anhydride in the presence of 0.1% triphenylphosphite. When an acid number of 33 was reached 0.15% of hydroquinone was added, the melt was cooled to room temperature, and the glassy polyester (hereafter designated as resin 8A) was powdered.

Polyester Cross Linking

Sixty grams of the above polyester resin 8A were mixed with 20 grams N, N', N'' triallylmelamine and melted at 120° C. Twenty grams N, N'-diallylmelamine, 2 grams zinc stearate, and finally 3 grams dicumeneperoxide were added, and the mix was then quickly cooled with dry ice. The brittle solid was mixed in a Waring blender with 100 grams of microcrystalline cellulose (AVICEL TG.101, FMC Corp.).

Molding and Glazing

The last-mentioned mix was formed into discs, 0.12 inch thick and 3 inches in diameter, and molded at 150° C and 430 p.s.i. for 6 minutes. After opening the mold 0.3 gram of a standard CYMEL 1080 melamine-formaldehyde glazing compound (American Cyanamid) was placed on the still hot discs, and the mold was closed again for 1½ more minutes. The cured melamine coating was 25 to 45 $\mu$ thick and adhered very well to the polyester substrate. The coating did not peel, blister or lose gloss when the discs were boiled in water for five hours.

EXAMPLE B

Polyester

An unsaturated polyester resin prepared from a polyol and a mixture of aromatic and alpha, beta unsaturated aliphatic polycarboxylic acids was prepared as described in Example A, except that the maleic anhydride was replaced with fumaric acid. The acid number of this polyester (hereinafter designated as resin 7A) was 45.

Polyester Cross Linking

The following materials were intimately mixed in a Waring-type blender, and thereafter passed through a 32 mesh Tyler sieve.

70 grams polyester (designation 7A)
30 grams N, N-diallylmelamine (m.p. 145°) (American Cyanamid)
3 grams dicumene peroxide
2 grams zinc stearate
80 grams clay, ASP-400 (as a filler)
20 grams Cab-O-Sil (as a filler)

Molding and Glazing

The last mentioned mix was molded and then glazed with Cymel 1080 melamine resin in the manner described in Example A. The melamine coating adhered very well to the polyester substrate, before and after treatment with boiling water for 5 hours.

The reactants used in the above examples are as follows:

isophthalic acid

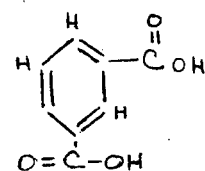

propylene glycol

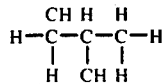

maleic anhydride

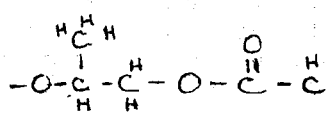

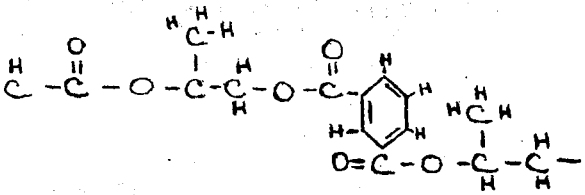

propylene  maleic  propylene  isophthalic  propylene

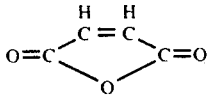

N, N-diallyl melamine

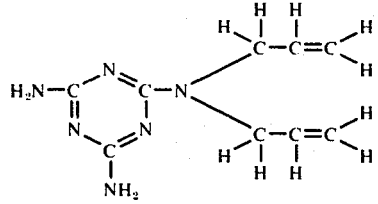

N,N'-diallyl melamine

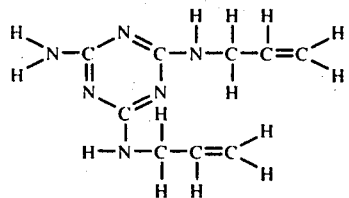

The melamine glazing resin is assumed to have a structure of the type:

The cross linking agent allyl melamine is believed to react with the maleic groups in adjacent polyester chains in essentially the following manner:

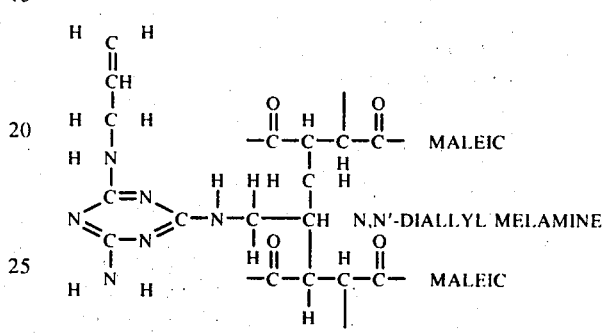

The exact mechanism by which the melamine glaze adheres to the cross linked polyester is not fully understood. However it is theorized that adherence is promoted by the fact that both melamine and allyl melamine have highly polar groups. These particular molecules both include $NH_2$ and NH groups that can form inter-molecular "hydrogen" bonds of the type:

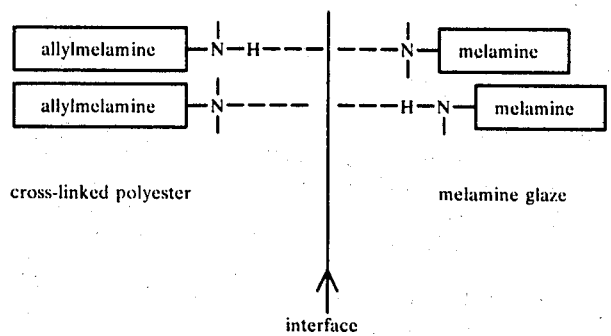

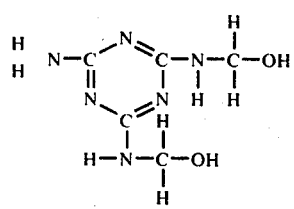

The propylene glycol is believed to react with the phthalic acid and maleic anhydride to produce polyester chains of the following general character:

It appears that the melamine glaze can be applied to the allyl melamine cross linked polyester substrate in various ways. In the case of the described Examples A and B the melamine glaze was applied to the still hot substrate in the form of tiny disc-like pills. In other experiments the melamine glaze was applied in powder form. The heated surface of the substrate effects temporary adherence of the glaze material during the time interval prior to the second closing of the mold.

In certain related experiments melamine glazes have been applied in solution form. The following Examples are illustrative:

EXAMPLE C

Glazing Solution

Commercial Cymel 1080 melamine resin was dissolved in water to give clear solutions with 40–60% solids; sodium lauryl sulfate was added to a final concentration of 0.1% to improve the wetting action of the solution.

Polyester Samples

Flat samples of commercial filled polyester, trade named Vibrinmat, were coated with a solution of 3.8 gram Epon 838 epoxy resin, and 2.8 gram Epotuf 610 epoxy hardener in 27 gram methyl ethyl ketone/n-butanol (1:1). The epoxy solution was applied as a thin coating (2–4μ), and was allowed to partially cure at room temperature for 2 hours.

Applying the Glazing Solution

The above-described glazing solution was sprayed on the epoxy-primed polyester samples, and oven-cured at atmospheric pressure for 1 hour at 95°C, then ½ hour at 125° C, and finally ¼ hour at 150° C. The final melamine glaze was about 10–60 μ thick, and was bubble-free and crack-free. It appeared to adhere very well to the polyester substrate.

EXAMPLE D

The above described melamine glazing solution was brushed on flat molded pieces of Cymel 1077 S melamine resin, and oven-cured as described in Example C. Bubble-free and crack-free coatings with good adhesion were obtained. The coating exhibited good resistance to abrasion and wear when scrubbed with wet morgan 150 mesh "Supersil" abrasive. Resistance to staining by various household chemicals was very good.

EXAMPLE E

Glazing Solution

One mole melamine and 2.2 moles aqueous formaldehyde (38%) were stirred at pH 8.8 and 90°C for 3 hours to give a water-clear, slightly hydrophobic resin, which was diluted with water to a solids concentration of 40%. Sodium lauryl sulfate was added to a final concentration of 0.1%.

Applying the Glaze Solution 180 grams of cellulose-filled melamine resin (Cyanamid Cymel 1077) was molded into a test piece at 149°C and 2000 p.s.i. for 5 minutes. After opening the mold the test piece was sprayed with the above melamine formaldehyde solution, after which the mold was closed and held at 149°C and 2000 p.s.i. for 3 minutes. The final coating was about 15 to 25 microns thick, and exhibited good gloss retention when subjected to abrasion testing.

EXAMPLE F

Solution Glazing of Allylmelamine-Crosslinked Polyester

Discs of allylmelamine-crosslinked polyester were molded according to Example A. After opening the mold the piece was sprayed with a melamine formaldehyde solution, prepared as in Example E. The mold was closed and held at 149° C and 2000 psi for 3 minutes.

The coating exhibited good adhesion to the polyester substrate and did not peel, blister or lose gloss when the discs were boiled in water for 5 hours.

Examples C, D. E and F are some indication that melamine glazing materials can be successfully applied to allyl melamine cross-linked polyester substrates in solution form. In practice the use of solutions may prove to be somewhat quicker and productive of a more uniform coating, as compared to the use of pills or powders.

The polyester substrate is usually formed as a pressure molding in the case of lavatories and lavatory-countertop units. However, in the case of larger articles such as bathtubs it may be more feasible to form the polyester substrate by spray-up techniques.

We claim:

1. A method of molding a composite article involving separately introducing reacting materials into the mold to produce a multi-layered article wherein one layer is self-sustaining prior to compositing, said method consisting essentially of:
   a. preparing a polyester resin by reacting substantially equi-molar parts of a phthalic acid and an alpha beta unsaturated polycarboxylic acid with a polyhydric alcohol in stochiometric amounts;
   b. mixing approximately 2 parts each of a tri allyl and a di-allyl melamine with approximately 6 parts of the polyester resin of step (a) to form a moldable polyester allyl melamine composition;
   c. molding the polyester-allyl melamine composition of step (b) into a substrate by subjecting the composition to a pressure at about 430 p.s.i., at a temperature of about 150°C, up to about 6 minutes;
   d. applying an allyl melamine resin in solid form to the molded substrate while said substrate is still hot and then continuing to subject the hot molded substrate to the heat and pressure of step (c) for about 1½ minutes to form a cured laminating polyester product having a relatively thin allyl melamine resin glazed coat of about 25–45 microns, the glaze coat being cross-linked and bound to the allyl melamine contained in the substrate.

* * * * *